United States Patent Office 3,254,042
Patented May 31, 1966

3,254,042
VINYL POLYMER LATEX CONTAINING A METHYLOL AMIDE OF A FATTY ESTER MALEYL ADDUCT
George W. Cogswell, Decatur, Ill., assignor to A. E. Staley Manufacturing Company, Decatur, Ill., a corporation of Delaware
No Drawing. Filed June 20, 1963, Ser. No. 289,385
11 Claims. (Cl. 260—23)

This invention relates to a composition of matter comprising a polyvinyl ester latex and a methylol amide of an adduct formed between a maleyl compound and an ethylenically unsaturated fatty acid ester of a polyhydric alcohol. It is particularly concerned with an emulsion of a vinyl acetate polymer which is capable of providing a water-resistant bond or coating which, at the same time, retains the stability, fluidity and various other physical properties of such an emulsion which makes it particularly useful as a coating, binder for non-woven fabrics, or adhesive.

The use of melts and solutions of water-insoluble artificial resins in the coating and adhesive art has been supplanted to a large extent by emulsions of such resins, particularly polyvinyl acetate emulsions, due to the improved ease, economy and safety with which the aqueous emulsions of the resin may be employed. On the other hand, the usefulness of water-insoluble polymer emulsions has been limited by the characteristic lack of water-resistance of the coatings and bonds deposited therefrom at room temperature and the tendency of such coatings and bonds to re-emulsify or disintegrate when subsequently brought into contact with water during the course of normal use of the object or article to which they have been applied.

This lack of water-resistance has been considered innate in the coatings and films deposited from such polymer emulsions inasmuch as water-soluble emulsifying and bodying agents are required to establish and stabilize the emulsions. These agents are apparently carried into the film or bond deposited from the emulsion upon application of the emulsion to a surface, and actively exhibit the emulsifying effect on the polymer comprising the body of the coating or the film and cause its redispersion when the surface is brought into contact with water.

Various proposals have been made to obviate the water-sensitivity of the coatings or bonds deposited from such emulsions, but in general, these proposals have been directed to modifying emulsions of such polymers which have been prepared in a specific manner, or require treating the emulsion with certain diluents. Due to the recognized tendency of the suggested diluents to either break or gel the emulsion shortly after the addition of the diluent, the diluents are added just prior to application of the emulsion.

Prior to the instant invention, for example, a common expedient for increasing the water-resistance of a coating or film deposited from a polyvinyl acetate polymer emulsion included the addition of a quantity of one or more substances such as dimethylol urea, trimethylol melamine, certain chromium salts, strong acids or highly reactive aldehydes such as glyoxal, certain resins and peroxides. In most instances, it was required that the substances be added to the polymer emulsion immediately prior to the use as the resulting compositions were unstable and certain of the substances resulted in a progressive increase in the viscosity of the emulsion until a gel was formed. Additionally, the modification effected by some of these substances did not result in a substantial improvement in the water-resistance of the coating or film deposited from the emulsion and often imparted undesirable color and foaming characteristics to the emulsion.

Polyvinyl acetate coatings and bonds also have poor resistance to organic solvents normally used in dry cleaning operations, such as carbon tetrachloride, perchloroethylene, Stoddard solvent, etc. The poor organic solvent resistance and poor water-resistance of applied polyvinyl acetate emulsions has tended to limit to some extent the use of polyvinyl acetate emulsion as textile finishing agents and as non-woven binders.

Many of the commercially available polyvinyl acetate emulsions also have a tendency to gel or set up when stored at temperatures slightly above room temperature. For example, storage at 110° F. for six days will convert many commercially available polyvinyl acetate emulsions into a solid gel, which cannot be redispersed by mixing or other convenient technique.

The object of this invention is to provide an aqueous emulsion of a vinyl ester polymer, particularly polyvinyl acetate, which is stable through long periods of storage and which will deposit a coating or bond that is resistant to water and conventional dry cleaning solvents.

The objects of my invention can be attained by adding a thermosetting methylol amide of an adduct formed between a maleyl compound and an ethylenically unsaturated fatty acid ester of a polyhydric alcohol, wherein said adduct contains on an average at least four potentially reactive carboxy groups, to the latex polymer. The methylol amide has several desirable properties which sets it apart from the materials previously used to insolubilize polyvinyl acetate coatings. In the first place the methylol amide does not react with the latex polymer or the emulsifier used to form the latex polymer until the polymeric composition is applied and cured. The methylol amide stabilizes those commercially available polyvinyl acetate latices which have a tendency to gel on storage at slightly elevated temperatures. Under the condition where commercially available polyvinyl acetate latices gel to an unusable solid, polyvinyl acetate latices containing a methylol amide of this invention form (at the worst) two phases systems, which redisperse readily with agitation. Further, the methylol amide is an excellent film former, surface active agent and adhesive. Accordingly, it can be used in almost any proportion without destroying the film-forming properties or bonding properties of the polyvinyl acetate emulsion. Further, films or coatings of polyvinyl acetate and methylol amide retain their integrity when treated with conventional dry cleaning solvents.

As explained in detail in commonly assigned application Serial No. 264,069, filed March 11, 1963, these methylol amide adducts can be prepared by (1) reacting an adduct of an alpha, beta-ethylenically unsaturated dicarboxy compound (a maleyl compound) and a polyhydric alcohol ester of ethylenically unsaturated fatty acids having a chain of from 10 to 24 carbon atoms with a basic nitrogen compound, which contains at least two active hydrogen atoms bonded to the same or different nitrogen atoms in the same molecule, and (2) reacting the product of step 1 with a formaldehyde source.

In the description that follows the words "dispersing" and "dispersion" are used in a generic sense to be inclusive of the words "suspending," "dissolving," "suspension" and "solution." The words "ammonia" and "ammonium hydroxide" are used interchangeably. The term "formaldehyde" is used in a generic sense to be inclusive of monomeric formaldehyde and formaldehyde-generating materials. The phrase "potentially reactive carboxy group" includes the amide group, the methylol amide group, the anhydride group, the free carboxylic acid group, and the carboxylate salt group.

The readily available naturally occurring glyceride oils, such as soybean oil, corn oil, cottonseed oil, linseed oil, hempseed oil, tung oil, peanut oil, safflower oil, tobacco seed oil, cod oil, herring (or menhaden) oil, dehydrated castor oil, etc., are the preferred esters because of their low cost and relatively large number of ethylenic double bonds available as sites for adduct formation. Other useful, though more expensive esters include linoleic acid esters of trimethylol propane, tall oil fatty acid esters of pentaerythritol, etc. In general, those compounds having on an average at least two and preferably three to nine non-conjugated ethylenically unsaturated groups per molecule are suitable. These can be thought of as being esters of a polyhydric alcohol (e.g. ethylene glycol, glycerol, trimethylol ethane, sorbitol, inositol, etc.) having from 2 to 6 hydroxyl groups with ethylenically unsaturated fatty acids of from 10 to 24 carbon atoms.

The maleyl compound (alpha, beta-ethylenically unsaturated dicarboxy compound) can be maleic anhydride, maleic acid, fumaric acid, dimethyl maleate, monomethyl hydrogen maleate, mono-2-ethylhexyl hydrogen maleate, citraconic acid, citraconic anhydride, itaconic acid, itaconic anhydride, ethyl maleic acid, maleimide, maleamic acid, etc. Of these, maleic anhydride is preferred because of (1) its low cost, (2) the ease with which it forms adducts in almost quantitative yields and (3) the high concentration of amide groups which result from the reaction of the anhydride adduct with a basic nitrogen compound. While maleic acid, which forms the anhydride, under the conditions of adduct formation has most of the advantages of maleic anhydride, it is twice as expensive as the anhydride. Fumaric acid, which approaches the cost of maleic anhydride on a weight basis, requires considerably more severe reaction conditions to form an adduct and even then, the yield is lower. Further, adducts prepared from free dicarboxylic acids that are not capable of forming an anhydride under the conditions of the maleation reaction and from half-esters and diesters produce amides with a lower concentration of amide groups after treatment with a suitable basic nitrogen compound than corresponding adducts containing the same concentration of carboxy groups in the anhydride form. It goes without saying that diesters are only suitable in this invention when at least some of the carboxy groups in the diester adduct are saponified during or before the addition of the basic nitrogen compound to permit amide formation. Citric acid and malic acid which form alpha, beta-ethylenically unsaturated dicarboxy compounds under the conditions of the maleation reaction can also be used in this invention.

Ammonia, which can be employed as gaseous ammonia or in the aqueous ammonium hydroxide form, is the preferred basic nitrogen compound because of its low cost, availability, high vapor pressure in water, the ease with which it forms amides and the ease with which its amides form methylol groups. Various primary amines; such as methyl amine, ethyl amine, and butyl amine; primary and secondary polyamines; such as ethylene diamine, diethylene triamine, propylene diamine and N, N'-dimethyl-ethylene diamine; can be used to partially or completely replace ammonia. All of these amines contain at least two active hydrogen atoms which can be bonded to the same or different nitrogen atoms in the same molecule.

Formaldehyde, generally as formalin, is the preferred source of formaldehyde. Polymeric forms of formaldehyde, such as trioxane and paraformaldehyde, are decidedly inferior to formaldehyde. These polymeric groups must be employed at much higher temperatures than the monomeric formaldehyde. Of course, the polymeric form is equivalent to the monomeric form if it is converted to the monomeric form before reaction with the amide adducts.

In somewhat greater detail the adduct is formed by reacting the long chain ethylenically unsaturated fatty compound and the maleyl compound at a temperature of about 150° C. to 300° C. in an open vessel or under pressure in an autoclave. While maleic anhydride forms an adduct in almost quantitative yields in an open vessel, other maleyl compounds, such as dibutyl maleate, give considerably better yields when the reaction is carried out under pressure.

The ratio of maleyl compound to ethylenically unsaturated long chain fatty ester in the reaction vessel can range from about 0.25 to 2 moles or more of maleyl compound per equivalent of unsaturation in the long chain fatty ester depending upon the choice of reactants and the desired properties of the products. For example, the preferred naturally occurring glyceride oils, such as soybean oil or linseed oil, can be reacted with from about 20% to 45% by weight of maleic anhydride to form adducts containing from about 2.0 to 4.5 maleic anhydride moieties per molecule of glyceride oil. (The resulting maleic anhydride portion of the glyceride oil adduct comprises from about 18% to 33% by weight of the product.)

The maleated long chain fatty ester can be converted to the amide by a variety of techniques. For example, an anhydride adduct, such as that resulting from the maleation of a naturally occurring glyceride oil with maleic anhydride or maleic acid, can be converted to the amide form in any of the following ways: (1) stirring the anhydride adduct in an atmosphere of ammonia until the exothermic reaction ceases, (2) adding concentrated aqueous ammonium hydroxide (28% aqueous solution, for example) to the anhydride adduct and stirring until the adduct disperses, (3) adding the anhydride adduct to concentrated aqueous ammonium hydroxide and stirring until the adduct disperses, (4) mixing the anhydride adduct with a calculated amount of water and then bubbling a sufficient amount of ammonia gas into the system to disperse the anhydride adduct, (5) mixing the anhydride adduct with a calculated amount of water, opening the anhydride ring by heating and then adding ammonia gas or aqueous ammonium hydroxide to disperse the adduct.

As explained in detail in application Serial No. 264,069, the percentage of potentially reactive carboxy groups, which are converted to amide groups, can be readily controlled. The amide groups can typically comprise from about 7.5% to about 42.5% of the potentially reactive carboxy groups. In general, it is preferred that at least one molecule of ammonia be added per each anhydride group (i.e. ½ mole of ammonia per each potentially reactive carboxy group) in the adduct in order to prepare adducts, wherein at least 15% of the potentially reactive carboxy groups are amide groups. The higher the concentration of amide groups, the better the water-resistance and solvent-resistance of the applied polyvinyl ester latex.

The amide adduct, which has preferably been dispersed in water, is then reacted with formaldehyde or a compound capable of generating formaldehyde, preferably by adding the formaldehyde source (usually formalin or paraformaldehyde depolymerized to the monomeric form) to the amide adduct or by adding the amide adduct to the formaldehyde source. This reaction can be carried out in a sealed vessel or in an open vessel. Generally, it is preferred to carry out this reaction at moderate temperature (5° C. to 75° C.) in an open vessel. A sufficient concentration of formaldehyde is added in this step to provide at least 0.7 mole of formaldehyde per each equivalent of nitrogen containing compound bearing a nitrogen atom bonded directly to hydrogen (each NH group) in the aqueous composition.

Excellent results have been obtained by adding at least about 0.8 mole of formaldehyde for each mole of basic nitrogen containing compound, which contains two hydrogen atoms bonded directly to nitrogen, used to form the amide. In this way essentially all the ammonium ions, etc. in the reaction medium are converted to non-volatile nitrogen and the methylol amide adduct is precipitated from the aqueous reaction medium as a water-insoluble hydrate. This frequently has a dough-like consistency. The formation of this precipitate is visual evidence that a sufficient concentration of formaldehyde has been added to the amide adduct.

If less than 0.7 mole of formaldehyde per each equivalent of nitrogen containing compound bearing an NH group is added to the aqueous amide, the methylol amide, by itself, does not impart all of the desired properties to the applied polyvinyl ester latex. However, such materials do prevent the gelation of commercial polyvinyl ester latices that have a tendency to gel at slightly elevated temperatures.

After the formaldehyde reaction, the resultant methylol amide is neutralized or made basic by the addition of a suitable basic material, preferably ammonium hydroxide or a volatile amine. Any precipitated amide is thereby redispersed.

The concentration of methylol amide can range from as low as 1 part by weight methylol amide per each 99 parts polyvinyl ester (D.S.B.) to as high as 95 parts by weight methylol amide per each 5 parts polyvinyl ester (D.S.B.). However, it is preferred that the methylol amide be used in a concentration of from about 5 to 50 parts by weight methylol amide and correspondingly 95 to 50 parts polyvinyl ester (D.S.B.). When less than 5 parts methylol amide per 95 parts polyvinyl ester are employed, the organic solvent-resistance of the applied composition is not at the optimum level.

Suitable latex polymers of the vinyl esters include the homopolymers and copolymers of vinyl formate, vinyl acetate, vinyl chloroacetate, vinyl propionate, vinyl butyrate, vinyl stearate, etc. Suitable comonomers include the mono and dialkyl esters of maleic acid, fumaric acid, and itaconic acid and the alkyl esters of acrylic acid and methacrylic acid, wherein the alkyl groups contain from 1 to 18 carbon atoms. Dimethyl maleate, dibutyl maleate, dibutyl fumarate, dioctyl fumarate, monomethyl itaconate, monobutyl itaconate, methyl acrylate, ethyl acrylate, isopropyl acrylate, 2-ethylhexyl acrylate, methyl methacrylate and octyldecyl methacrylate are representative of alkyl esters of alpha, beta-ethylenically unsaturated mono and dicarboxylic acids. Other suitable comonomers include maleic anhydride, acrylic acid, methacrylic acid, crotonic acid, etc. While these comonomers can comprise up to about 50 mole percent of the polymeric units in the copolymer, it is usually preferable that they comprise less than about 20 mole percent of the polymeric units in the copolymer.

The preferred polymers of this invention are the homopolymers and copolymers of vinyl acetate with copolymerizable ethylenically unsaturated monomers, wherein the vinyl acetate comprises at least 80 mole percent of the monomeric units in the polymer. The methylol amides described herein are most effective with these polymers. Polymers of the higher vinyl esters, such as vinyl propionate are less water-sensitive thn the polymers of vinyl acetate. Accordingly, the water-resistance conferred on these polymers by the methylol amide is less noticeable. However, the organic solvent resistance of these polymers is improved by the methylol amide. On the other hand, films of vinyl formate polymers, which are normally very water-sensitive because of the hydrolysis tendencies of the formate group at pH 7, are little improved in water resistance by the methylol amides although solvent resistance is considerably enhanced.

The polyvinyl ester emulsions can be prepared under typical free radical emulsion polymerization conditions using a peroxide such as hydrogen peroxide or potassium persulfate, and a water-soluble emulsion stabilizer such as polyvinyl alcohol, carboxymethyl cellulose or hydroxyethyl cellulose. In those cases where polymerization facilities are not available any of the commercially available polyvinyl ester emulsions can be used.

The polyvinyl ester-methylol amide composition can be used in the same way as the conventional polyvinyl ester emulsion polymers except that the methylol amides properties are preferably developed to their utmost by heating the applied composition to about 110 to 250° C. Generally, it is preferred to first dry the applied material at about 100 to 135° C. and then complete the reaction of the methylol amide at 140° C. to 200° C. for about 1 to 10 minutes. However, if desired the composition may be permitted to cure by drying at room temperature.

A catalyst, such as melamine dissolved in formalin, hexamethylene tetramine, ammonium p-toluene sulfonate, ammonium vanadate, ammonium molybdate, zinc fluoroborate, zirconium ammonium acetate, zinc ammonium acetate, etc., can be used to speed up the cure or permit the use of curing temperatures as low as 110–120° C. The catalyst can be used in a concentration up to about 5% by weight of the methylol amide.

As illustrated in Example XXVI of Serial No. 264,069, zinc salts are advantageous catalysts for room temperature cures of methylol amides. In such cases the catalyst is used in a concentration of from about 5 to 15% by weight of the methylol amide. When such catalysts are employed the polyvinyl ester-methylol amide composition can be used in exactly the same way as the conventional polyvinyl ester emulsion without any heat curing step.

The following examples are merely illustrative and should not be construed as limiting the scope of the invention.

*Example 1*

A 60% active material aqueous solution of a methylol amide having on an average 6 potentially reactive carboxy groups per molecule was prepared in the following manner:

Eight hundred and eighty-four grams of bleached soybean oil (1 mole) was heated to 230° C. in a three-necked flask equipped with a stirrer, reflux condenser and addition port. After 294 grams (3 moles) of liquid maleic anhydride had been added through the addition port over a period of one and one-half hours, the composition was heater to 250° C. and held there for 15 minutes. The maleated oil, after cooling to about 50° C. was added to 700 grams of aqueous ammonium hydroxide (6 moles ammonia) while the reactants were maintained at between 25–50° C., thereby dissolving the maleated oil. By distilling off ammonia from a slightly basic sample of the solution it was determined that about 42.5% of the potentially reactive carboxy groups (85% of the starting anhydride groups) had been converted to the amide form. Five hundred and fifteen grams of formalin (6.3 moles formaldehyde) were added rapidly to the solution and the pH of the aqueous system dropped to about 5 to 5.5 precipitating the methylol amide as a water-insoluble hydrate. The water-insoluble hydrate was redissolved by slowly adding 143 grams of aqueous ammonium hydroxide (2.1 moles ammonia) while maintaining the exothermic reaction at about 50° C. The solution had a pH of about 7. Then 21.2 grams ethylene diamine (0.35 mole) and 52.0 grams aqueous ammonium hydroxide (0.77 mole ammonia) were added to adjust the pH of the aqueous solution of methylol amide to a value of 7.5–8.5. The final product was approximately 60% active material.

A 10" by 20" piece of 100 percent viscose carded web weighing about 0.3 ounce per square yard was sandwiched betwen supporting glass-fiber screening and then impregnated by dipping the sandwich into an aqueous bath containing 13.5% by weight of a homopolymer of vinyl acetate, which was prepared using a hydroxyethyl cellulose suspending agent, and 1.5% by weight active methylol amide, prepared as described above. The impregnated sandwich was then passed through the steel and hard rubber rolls of a two-roll Birch padder at 25 p.s.i. The supporting glass fiber screening was removed and the impregnated web was placed on paper and dried five minutes at 110° C. After drying the web was cured 2 minutes at 150° C. The web was then calendered twice on the padder at 65 p.s.i. with the steel rolls immersed in hot water at 60° C. and dried for one hour at 40° C. The resulting non-woven fabric and a fabric prepared in the same way using only a 15% by weight polyvinyl acetate impregnating bath, were each subjected to the Standard Launder-O-Meter test according to A.A.T.C.C. specification No. 61–1962. The fabric prepared with the methylol amide-polyvinyl acetate composition showed only slight fraying on the ends after a 90 minute cycle in the Launder-O-Meter. The fabric prepared without the methylol amide was destroyed in less than 15 minutes in the Launder-O-Meter.

*Example II*

This example illustrates that the shelf stability of polyvinyl acetate latex polymer is improved by the addition of a suitable methylol amide. Ten parts of the sixty-percent-active methylol amide, prepared in Example I, was added to 100 parts of a homopolymeric vinyl acetate latex (55% total solids), which was prepared with polyvinyl alcohol suspending agent, and to 100 parts of a homopolymeric vinyl acetate latex (55% total solids), which was prepared with a hydroxyethyl cellulose suspending agent. The above samples and the homopolymeric vinyl acetates latices having no methylol amide addition were all stored in an oven at 110° F. for two weeks. Within six days the homopolymeric vinyl acetate latices having no methylol amide additive set up forming solid gels which could not be redispersed. After 14 days the polyvinyl acetate emulsions, which contained the methylol amide additive, had separated into two phases. However, completely homogeneous products resulted after the two phase material was stirred.

*Example III*

This example illustrates the compatibility of the methylol amide of Example I with two commercially available polyvinyl acetate latex polymers. The methylol amide of Example I (60% by weight active material) and the commercially available polymers were compounded on an as is basis and at 20% concentration. The compatibility of the systems is set forth below in Table I. In the table, the top line, or "A" line, represents the "as is" composition; the bottom or "B" line, represents the composition at 20% concentration. "I" stands for incompatible; "PC" stands for partly compatible; "C" stands for compatible; "T.S." stands for total solids; and "*" indicates that the samples redispersed when stirred again.

2. An aqueous composition comprising a resinous polymer of at least 50 mole percent vinyl acetate and a methylol amide of an adduct formed between a maleyl compound and an ethylenically unsaturated fatty acid ester of a polyhydric alcohol having on an average at least 4 potentially reactive carboxy groups per molecule of which at least about 7.5% of said potentially reactive carboxy groups contain amide nitrogen groups.

3. The composition of claim 2, wherein said resinous polymer of vinyl acetate comprises from 5 to 99 parts by weight and said methylol amide comprises 95 to 1 parts by weight, the total being 100 parts by weight.

4. The composition of claim 3, wherein said maleyl compound comprises a compound selected from the group consisting of maleic acid and maleic anhydride.

5. An aqueous composition comprising a resinous polymer of at least 50 mole percent vinyl acetate and a methylol amide of a maleated glyceride oil having on an average at least 4 potentially reactive carboxy groups per molecule of which at least about 7.5% of said potentially reactive carboxy groups contain amide nitrogen groups, wherein the weight ratio of polymer of vinyl acetate to methylol amide is from 1:1 to 19:1.

6. An aqueous composition comprising a resinous polymer of at least 50 mole percent vinyl ester and a thermosetting material prepared by the steps of (1) reacting a compound containing a basic nitrogen atom selected from the group consisting of ammonia, amines having at least two hydrogen atoms bonded to nitrogen and mixtures thereof with an adduct formed between a maleyl compound and an ethylenically unsaturated fatty acid ester of a polyhydric alcohol, the adduct having on an average at least 4 potentially reactive carboxy groups per molecule, the concentration of the first said compound being sufficient to provide at least ½ mole of basic nitrogen containing compound per potentially reactive carboxy group and (2) reacting an aqueous solution of step (1) with formaldehyde.

7. The composition of claim 6, wherein said maleyl compound comprises a compound selected from the group consisting of maleic acid and maleic anhydride, and said compound containing a basic nitrogen atom comprises ammonia.

8. The composition of claim 7, wherein said resinous polymer of a vinyl ester is a resinous polymer of vinyl acetate and said ethylenically unsaturated ester of a polyhydric alcohol comprises a glyceride oil.

TABLE I.—RATIO OF METHYLOL AMIDE OF EXAMPLE I TO POLYMER

| Test Polymer | | 1:4 | | | 1:1 | | | 4:1 | | |
|---|---|---|---|---|---|---|---|---|---|---|
| | | Immediate | 8 Hours on Standing | 24 Hours at 125° F. | Immediate | 8 Hours on Standing | 24 Hours at 125° F. | Immediate | 8 Hours on Standing | 24 Hours at 125° F. |
| Elvacet 81-900 (55% T.S.) | A | C | I* | I* | C | PC | PC | C | PC* | PC*. |
| Polyvinyl Acetate | B | C | C | C | C | I* | I* | C | I* | I*. |
| Polyco-694 (55% T.S.) | A | C | I* | I* | C | I* | I* | C | I* | I*. |
| Polyvinyl Acetate | B | C | C | PC* | C | C | PC* | C | PC* | C. |

Since many embodiments of this invention can be made and since many changes may be made in the embodiments described, the foregoing is to be interpreted as illustrative only and my invention is defined by the claims appended hereafter.

I claim:

1. An aqueous composition comprising a resinous polymer of at least 50 mole percent vinyl ester and a methylol amide of an adduct formed between a maleyl compound and an ethylenically unsaturated fatty acid ester of a polyhydric alcohol having on an average at least 4 potentially reactive carboxy groups per molecule of which at least about 7.5% of said potentially reactive carboxy groups contain amide nitrogen.

9. The composition of claim 8, wherein at least ½ mole of ammonia is added in step 1 per each potentially reactive carboxy group.

10. The composition of claim 9, wherein at least 0.7 mole of formaldehyde is added in step 2 per each equivalent of nitrogen containing compound bearing an NH group.

11. The composition of claim 10, comprising a weight ratio of polymer of vinyl acetate to methylol amide of 1:1 to 19:1.

(References on following page)

References Cited by the Examiner

UNITED STATES PATENTS

| | | | |
|---|---|---|---|
| 2,941,968 | 6/1960 | McKenna | 260—23 |
| 3,004,868 | 10/1961 | Sumner et al. | 117—140 |
| 3,081,197 | 3/1963 | Adelman | 117—145 |
| 3,095,393 | 6/1963 | Matt | 260—21 |
| 3,122,447 | 2/1964 | Sexsmith | 117—140 |

LEON J. BERCOVITZ, *Primary Examiner.*

DONALD E. CZAJA, *Examiner.*

R. A. WHITE, *Assistant Examiner.*